Jan. 26, 1971 B. BURNHAM 3,559,160

SPATIAL SURVEYING AND TARGET-DETECTION SYSTEM

Filed Nov. 7, 1963 4 Sheets-Sheet 1

INVENTOR.
BRADSHAW BURNHAM
BY Philip Schneider
Louis B. Applebaum
ATTORNEYS

Jan. 26, 1971 B. BURNHAM 3,559,160

SPATIAL SURVEYING AND TARGET-DETECTION SYSTEM

Filed Nov. 7, 1963 4 Sheets-Sheet 2

INVENTOR.
BRADSHAW BURNHAM
BY Philip Schneider
Louis B. Applebaum
ATTORNEYS

SPATIAL SURVEYING AND TARGET-DETECTION SYSTEM

Filed Nov. 7, 1963 4 Sheets-Sheet 3

INVENTOR.
BRADSHAW BURNHAM
BY Philip Schneider
Louis B. Applebaum
ATTORNEYS

INVENTOR.
BRADSHAW BURNHAM
BY Philip Schneider
Louis B. Applebaum
ATTORNEYS

United States Patent Office 3,559,160
Patented Jan. 26, 1971

3,559,160
SPATIAL SURVEYING AND TARGET-DETECTION SYSTEM

Bradshaw Burnham, Rochester, N.Y., assignor, by mesne assignments, to the United States of America as represented by the Secretary of the Navy Filed Nov. 7, 1963, Ser. No. 323,195
Int. Cl. G01s 3/00
U.S. Cl. 340—6 10 Claims This invention relates to target-recognition systems and especially to a target-recognition system employing an interdigitated transducer array and photo-integration in conjunction with a beam-steering system.

In the reception of signals from distant sources, difficulty is encountered in distinguishing the desired signals from the noise signals in which they are immersed. Various means of improving signal-to-noise characteristics of receiving systems are in use, such as directive transducer arrays, very-low-noise preamplifier circuits, etc. Special problems exist in sonar detection of long-range targets in the ocean. Here the ambient noise level, the attenuation sound by the medium and path distortion are all very great. The present invention provides advantages in these respects by using an interdigitated array thereby providing a monocular system in which the path distortion is the same for each portion of the array and by using photo-integration for building up target returns relative to noise signals. Also, the present invention provides an advantage over a pure echo system in that it may be used either as an echo system or as a passive listening system, the latter giving a distinct advantage in received signal strength over the echo system.

The objects and advantages of the present invention are accomplished by using an interdigitated transducer array in combination with a modified DIMUS beam-steering system for producing a plurality of polarized half-beam outputs. Each set of half-beam outputs is then processed to provide four polarized output conditions, ++, — —, +— and —+, each of these is utilized to energize an indicator unit, such as a neon lamp. A surplus of ++ or — — over the —+ and +— conditions, which is greater than the deviation to be expected by probability statistics, indicates reception of target signals by that particular beam. The signal-to-noise ratio of the received signals is improved by long-term summation of the light outputs of the indicator lamps by a photographic process which uses photo-integration.

An object of the invention is to detect faint target signals which are masked by noise signals.

Another object is to improve the signal-to-noise ratio obtainable by a beam-steering system which uses a directive transducer receiving array.

Other objects and many of the attendant advantages of this inevntion will be readily appreciated as the same becomes better understood by reference to the following detailed description when considered in connection with the accompanying drawings wherein.

Figure 1:
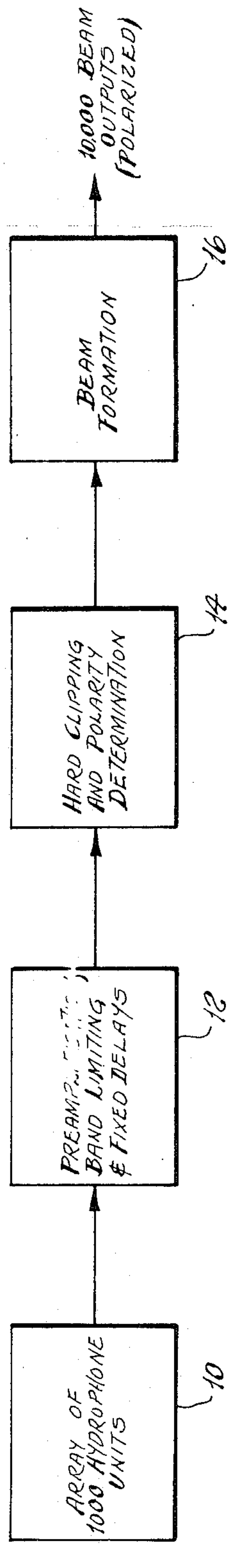
Fig. 1 (PRIOR ART)
FIG. 1 is a functional block diagram of a Dimus beam-steering system.

The present invention utilizes a modified DIMUS system as a component. The Dimus system, which is described in an article by V. C. Anderson in the "Journal of the Acoustic Society of America," vol. 32, No. 7, July 1960, is a beam-steering system in which the outputs of an array of a great number of hydrophones are sampled, suitably delayed in shift registers and summed in different combinations to provide a plurality of beam outputs. Each beam output is associated with a beam which represents a particular spatial area having specific azimuthal and vertical coordinates. For example, the hydrophone array might consist of 1,000 hydrophones and 10,000 beams might be formed from the hydrophone outputs, the beams representing 50 elevations and 200 azimuths in the space surrounding the hydrophone array. Each beam output may be either of positive or negative polarity. The Dimus system is indicated by a functional block diagram in FIG. 1.

The present invention (see FIG. 2) divides the transducer array into two interdigitated halves of 500 hydrophones each. The signal outputs of the half-arrays are now separately processed by Dimus-type signal processing means 20 (comprising equipment encompassed by blocks 12, 14 and 16 in FIG. 1) to provide 10,000 pairs of polarized (positive or negative) half beam signals (This system can be called a modified Dimus system.) The remainder of the present invention comprises permuting means 22 and storage means 24, and may include utilization means 26 as well. (It should be noted that in a wider sense the utilization means may be considered as including the permuting means 22 and the storage means 24—in other words, as all equipment which makes use of the polarized half-beam outputs.)

Figure 2:
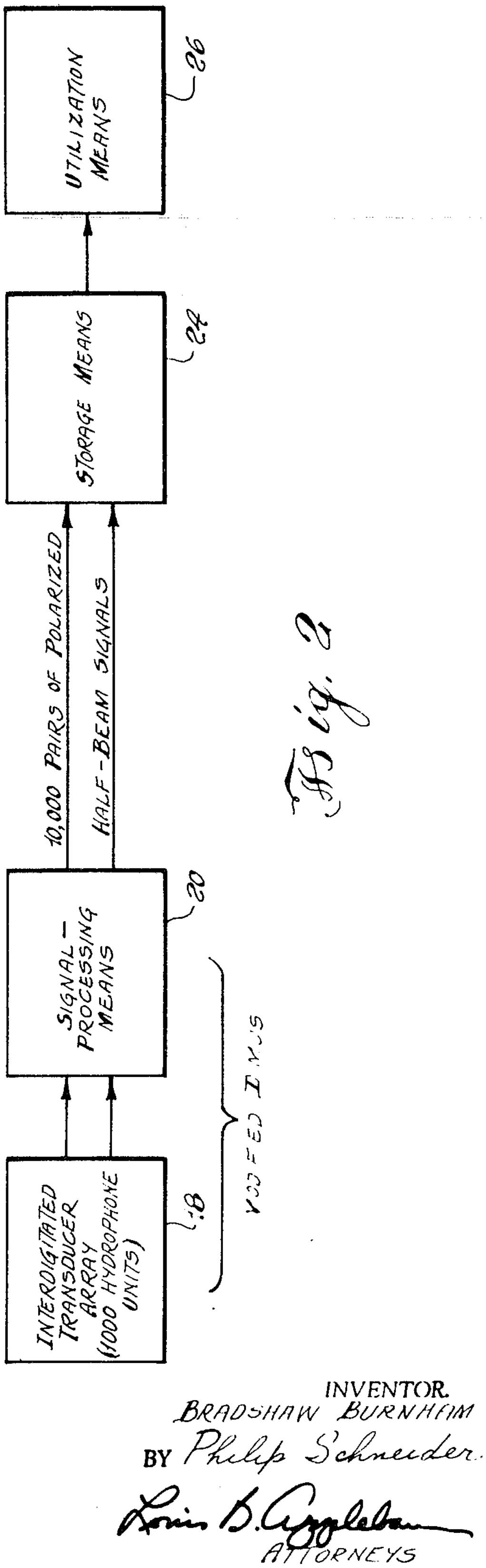
FIG. 2 is a functional generalized block diagram of a preferred embodiment of the present invention.
Figure 3:
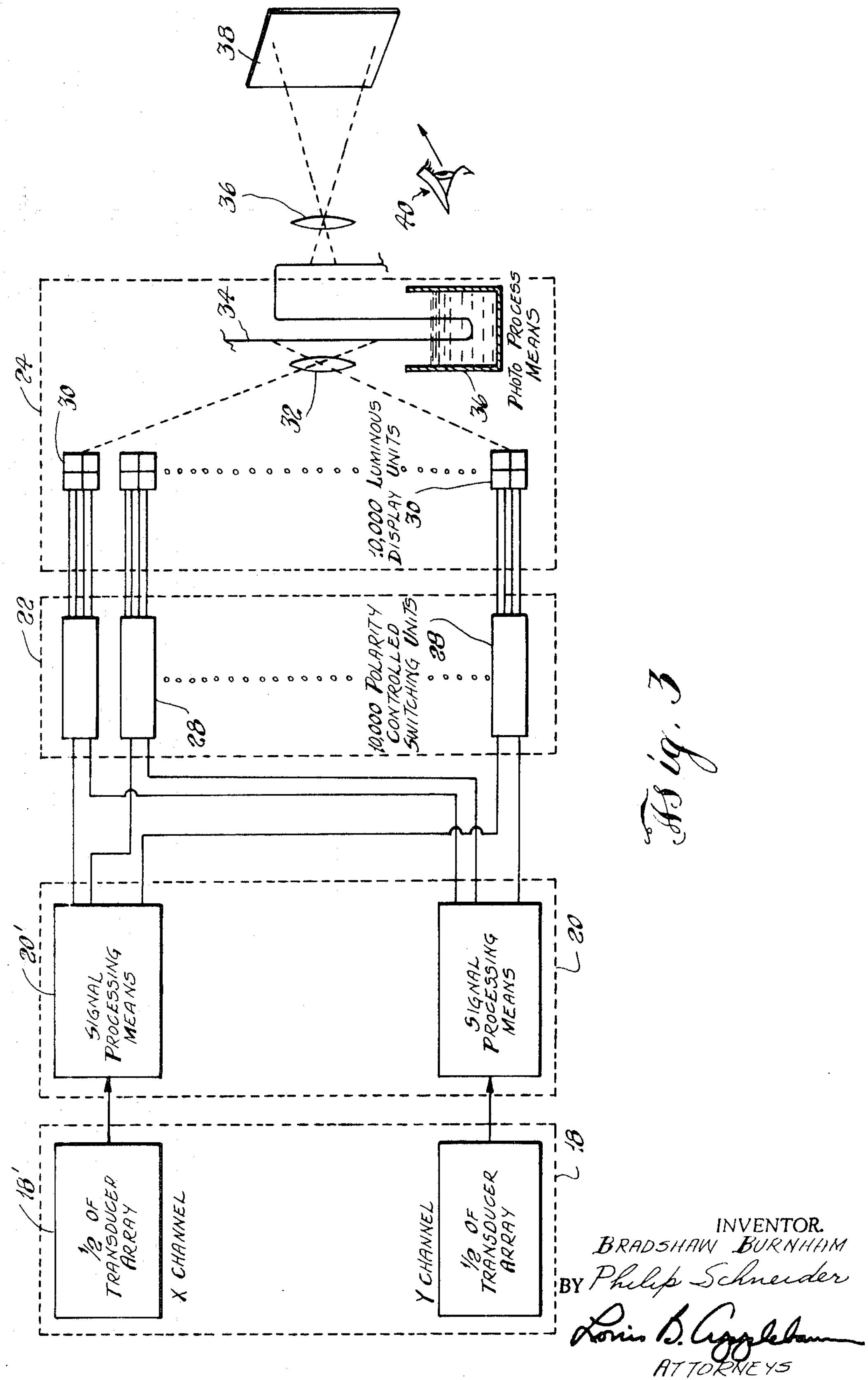
FIG. 3 is a more detailed block diagram of an embodiment of the present invention.
Figure 4:
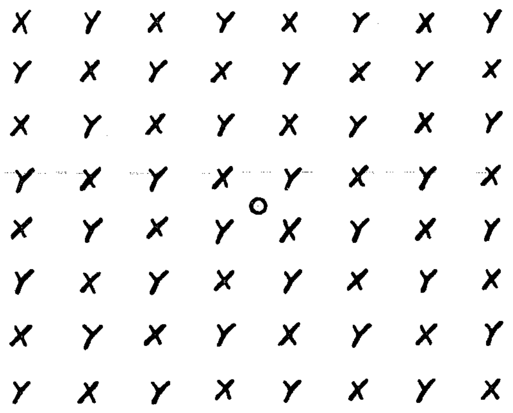
FIG. 4 is a schematic diagram showing the transducers in an interdigitated array.

FIG. 3 shows a more detailed breakdown of FIG. 2. The transducer array 18 is separated into interdigitated halves 18' providing X-channel and Y-channel signals. FIG. 4 shows the principle by which a transducer array is interdigitated. An array of 64 transducers is divided into two groups, the X and the Y transducers, each X transducer alternating with a Y transducer. The perpendicular through the center of gravity of the array (marked 0) is the boresight line for the entire array 18 and for each half-array 18'. The number of transducers shown (64) is purely for illustrative purposes; it might be any even number and in the particular embodiment being described herein has been taken as 1000.

The distance between each transducer in the original array 18 is sufficient to render the noise contributions independent and the same is true for the half-arrays. However, for a signal source which, of course, lies at a distance from the interdigitated array, signals will arrive at adjacent X and Y transducers essentially in phase congruence. Thus, the half-beam of the two half-arrays (each half-beam composed of 10,000 pairs of polarized signals) occur in pairs in which the target signals are in phase but the noise signals are independent, random variations. This difference presents the possibility of differentiating the target signals from the noise.

The Dimus operation results in a moving pattern of polar decisions in the shift registers associated with each of the half arrays. Every 2000th of a second, the Dimus produces a new set of 1000 polar determinations, or decisions, which are suitably added to form the half-beams. On the average, with no received signals except random noise, the count will be 250 plus and 250 minus decisions for each half-beam. (Since the Dimus output signals are quantized in amplitude, it is important that the decision quanta be equal, otherwise the reconstitution of the signal may be subject to random error from quantum variation.) Each channel yields zero output for all combinations of 250 plus and 250 minus decisions, and a plus or a minus output for every other numerical situation. Every pair of half-beams is switched at the Dimus rate to equipment which permutes the half-beam outputs to, and separately indicates, the polar conditions ++, −+, +−, and −−, and which ignores the conditions 0+, 0−, −0, +0 and 00.

For every counting interval ($\frac{1}{2000}$ of a second, during which 500 polar decisions are made for each half-beam) the polar condition of a half-beam can be classified as:

(1) A positive or negative count within the random statistical expectancy. This is the normal condition when no signal is to be reported. The random statistical expectancy might be within $250\pm\sigma$, for example, where $\sigma$ is the standard deviation. As the number of counting intervals increase, the average count per interval would tend to approach more and more closely the value of 250 plus and 250 minus polarity decisions per half beam;

(2) A positive count numerically greater than random statistical expectancy. To the extent that the count exceeds statistical expectancy, there is a probability that an inphase signal is being received from some target or that there is some sort of bias in the receiving system;

(3) A negative count numerically greater than the random statistical expectancy. To the extent that the count is negative and exceeds statistical expectancy, there is a probability that a target signal is being received from a direction not indicated by the beam, or that there is some sort of bias in the receiving system.

Each set of the 10,000 pairs of half-beam outputs may now be connected to some type of storage means 24; for example, each wire of a pair may be connected to a different one of a pair of condensers. If, after a number of counting intervals, the voltages on the condensers are measured and exceed the value of voltage to be expected from random statistical expectation, i.e., is strongly positive or negative, it may be said that a target is present in the spatial area represented by that pair of condensers or that pair of half-beams.

A preferred method for determining the presence of a target is a photo-integration method. Here, the 10,000 pairs of polarized half-beam signals are connected to a permuting means 22 comprising 10,000 polarity-controlled switching units 28. Each switching unit 28 converts its input signals into equivalent sets of ++, +−, −+, or −− signals, each of which sets will operate a different one of a set of four lamps (luminous display unit 30) to which the switching unit 28 is connected.

Thus, for each beam, the polarity decisions of the Dimus are switched to serve four light sources representing the four polar conditions that are to be counted, but permit only one light to be on at any instant, and no light when either channel reports a zero. The four switching circuits are adjusted to be free of bias. The four lights are disposed in a luminous display and adjusted to be identical in their light outputs. When input is not being received from a target, a film 34 in a camera 32 (represented by a lens symbol in FIG. 3) taking a time exposure of the four lights shows equal density for each light. When input is being received from a target and the two halves of the beam have phase-congruent signals, the switching process operates to increase the amount of light falling on the portions of the film representing ++ and −−, and to decrease the amount of light falling on the portions of the film representing +− and −+, and the amount of increase and decrease is proportional to the exposure time. The action of the photographic film in this application is termed photo-integration. In the process, photographic film may also act as an amplifying system serving to emphasize the small difference in the energies falling on the coincidence and anticoincidence areas.

Figure 5:
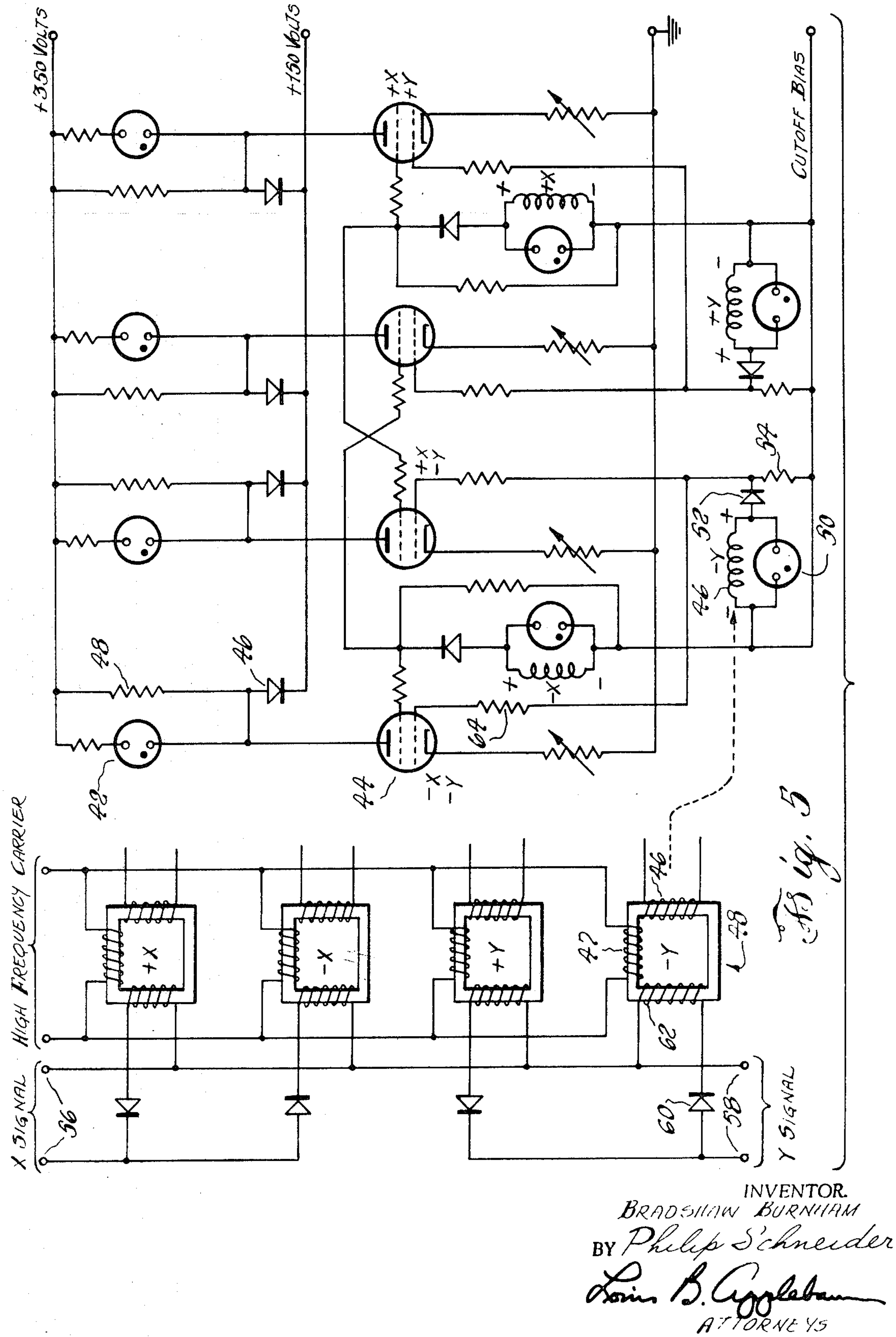
FIG. 5 is a wiring schematic diagram of a polarity controlled switching unit and its associated luminous display unit.

FIG. 5 shows the wiring diagram for a circuit which provides the four luminous outputs representing the four different polar conditions described above. The circuit is part of the storage means 24 and comprises one polarity-controlled switching unit 28 and one luminous display unit 30. The luminous display unit 30 consists of four neon lamps 42 (NE–2P, for example) which are actually mounted in a square honeycomb configuration.

Each neon lamp 42 is connected in the plate circuit of a different one of four dual-grid vacuum switching tubes 44 (6BN6, for example). To assure electrical constancy of the lamp current, each plate is clamped by a diode 46 to a 150-volt regulated bus during its conduction period, and is resistance-stabilized during the cut-off period by connection through resistance 48 to a 350-volt bus. The eight grids of the four, dual-grid switching tubes 44 are driven with respect to cut-off bias by four rectifier networks, each of the latter comprising the output winding 46 of a different one of four high-frequency saturable reactors 48, a neon lamp 50 across the output winding 46, a rectifying diode 52 in series with the high side of the output winding 46 and a resistance 54 forming a return path to the low side of the output winding 46 from the cathode of the diode 52. The control winding 47 of each saturable reactor 48 is driven by energy from a high-frequency carrier source. The X- and Y-channel outputs, which are fed to the circuit through terminal sets 56 and 58, respectively, are separated by the input diodes 60 so that each distinct signal is connected to only one saturable-reactor input winding 62. Thus only one of the X- and one of the Y-channel saturable-reactor output windings 46 will be furnishing potential to the reactifier networks serving the switching tube grids, and only one switching tube can have both of its grids simultaneously positive (i.e., only one switching tube and its associated neon lamp can conduct current at any instant). This means that only one of the four neon lamps in a luminous display unit 30 will flash at any instant (or more precisely, during any counting interval of $\frac{1}{2000}$ of a second duration).

To stabilize the grid currents controlling the switching tubes, each saturable-reactor output winding 46 is shunted by a voltage-regulating tube 50 which makes the output voltage (when the reactor is excited) independent of the amplitude of the input winding excitation. After rectification by diode rectifier 52, each output voltage drives one grid of each of two switching tubes, for example, the Y signal drives grids in the first and second switching tubes. The set of four switching tubes thus provides the set of four polar conditions, −−, +−, −+ and ++. The grids of the switching tubes are driven through limiting resistors 64 that are high compared to the grid impedance. Current to the switching tube grids is thereby made virtually independent of the tube characteristics and the amplitudes of the polar decisions exciting the saturable reactors.

For signals falling in the normal statistical expectancy range of $250\pm\sigma$ polarity decisions for a half-beam, neither reactor of the channel is energized. For any other combination, one or the other saturable reactor of the channel is activated.

Other suitable methods of indicating the four polar conditions may be employed if desired.

Figure 6:
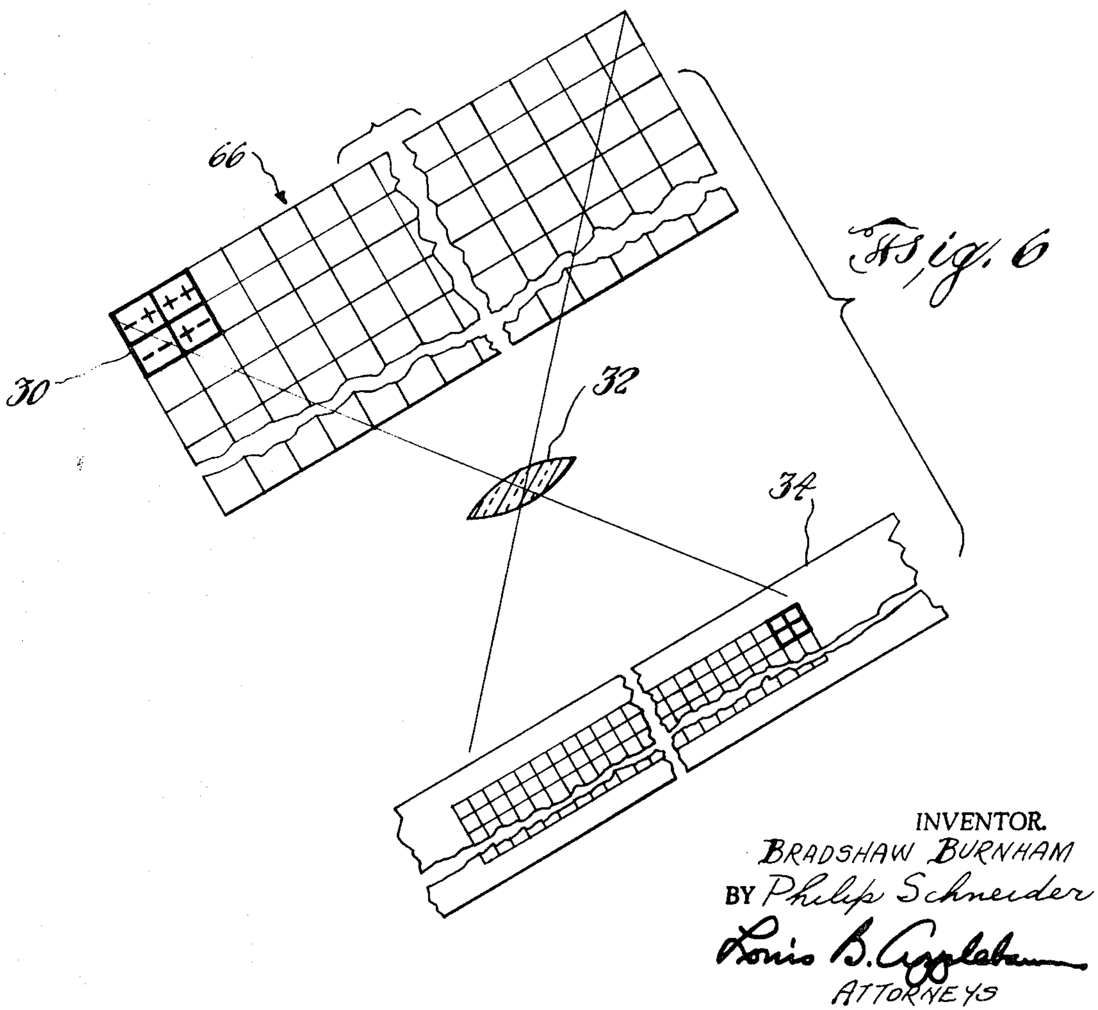
FIG. 6 is a schematic diagram showing how the luminous display block is constructed and how the film is placed in relation to the block.

The luminous display units 30 of four neon lamps each may be mounted together to form a rectangular display block 66, as shown in FIG. 6. Each lamp is mounted within a cell and a translucent diffusing screen, such as a thin flashed opal glass with the flashed side turned toward the neon lamps, may be placed over the cell openings. The diffusing screen and white painted cell walls combine to provide a uniform light flux over the entire area and make it possible to obtain photographs with no visible intersection lines between cells. In FIG. 6, one of the display units 30 is outlined more strongly than the others for purposes of illustration and a possible configuration of polar conditions is indicated.

The film 34 is exposed for a relatively long time interval as compared to the interval necessary for forming a beam ($\frac{1}{2000}$ of a second). This permits random variations of beam output to the averaged out and permits target signals which would be lost in the noise signal in any single beam output to build up film densities that are higher than the noise signal density, thereby giving a positive indication of the presence of a target. There is an optimum time of exposure which depends upon the characteristics of the particular film being used: handbooks of film characteristics, such as those published by the Eastman Kodak Co. give such details.

Typical dimensions for the display might be .375 x .375 inches for each cell, giving a display block of 3 ft., 1½ in. by 12 ft., 6 in. for 10,000 display units. Use of long focal length camera lens 32 which achieves a nine-to-one optical reduction would give a display block image 105.8 x 423.3 mm.

The exposed film can be developed by any suitable photo processing means 36, preferably automatic processing means which treats the film as a moving belt. Readout can be accomplished by utilizing a film projector 36 (symbolized by a lens) to project the photograph upon a screen 38 where it can be monitored by an observer 40.

It is also possible to use automated photoelectric analysis of the photographic record instead of a human observer. This method would employ continuous sequential scanning of luminous display units to detect target-indicative patterns. Beam information would be in the form of electrical signal outputs which would be transferred to other data handling equipment.

Obviously many modifications and variations of the present invention are possible in the light of the above teachings. It is therefore to be understood that within the scope of the appended claims the invention may be practiced otherwise than as specifically described.

I claim:

1. A target-detection system comprising, in combination: a plurality of receiving transducers arranged in a directive array, each said transducer being spaced at such distance from its nearest neighbors as to have an independent response to noise signal characteristics, said transducers being divided into two interdigitated groups and connected together to form two interdigitated half-arrays;

a beam-forming system receiving as input signals the output signals of said half-arrays and converting said signals into sets of polarized half-beam signals, each one of a set associated with a different one of said half-arrays; and utilization means including summing means for receiving said set of polarized half-beam signals and operating upon them to give an indication as to which half-beam sets are providing polar condition permutations which, when summed over a period of time, exceed the statistical expectancy for that period of time by a significant amount.

2. A target-detection system comprising, in combination:

a plurality of receiving transducers arranged in a directive array, each transducer being spaced at such distance from its nearest neighbors as to have an independent response to noise signal characteristics, said transducers being divided into two interdigitated groups and connected together to form two interdigitated half-arrays;

a beam-forming system receiving as input signals the output signals of said half-arrays and converting said signals into sets of polarized half-beam signals, each one of a set associated with a different one of said half-arrays;

permuting means for converting each set of polarized half-beam signals into a set of four polar condition signals, ++, −−, +− and −+; and utilization means connected to said permuting means for receiving said polar condition signals and separately aggregating each type.

3. A target-detection system comprising, in combination:

a plurality of receiving transducers arranged in a directive array, each said transducer being spaced at such distance from its nearest neighbors as to have an independent response to noise signal characteristics, said transducers being divided into two interdigitated groups and connected together to form two interdigitated half-arrays;

a beam-forming system receiving as input signals the output signals of said half-arrays and converting said signals into sets of polarized half-beam signals, each one of a set associated with a different one of said half-arrays;

permuting means for converting each set of polarized half-beam signals into a set of four polar condition signals, ++, −−, +− and −+; and display means for individually indicating the presence of each of said polar condition signals.

4. A target-detection system comprising, in combination:

a plurality of receiving transducers arranged in a directive array, each transducer being spaced at such distance from its nearest neighbors as to have an independent response to noise signal characteristics, said transducers being divided into two interdigitated groups and connected together to form two interdigitated half-arrays;

a beam-forming system receiving as input signals the output signals of said half-arrays and converting said signals into sets of polarized half-beam signals, each one of a set associated with a different one of said half-arrays;

permuting means for converting each set of polarized half-beam signals into a set of four polar condition signals, ++, −−, +−, and −+;

luminous means for individually indicating the presence of each of said polar condition signals by a light signal; and photographic means comprising lens means and film means for focusing an image of said luminous means upon a film and making a photographic exposure thereof.

5. A target-detection system comprising, in combination:

a beam-forming system of the modified Dimus-type, which has two interdigitated half-arrays, receiving as input signals the output signals of said half-arrays and converting said signals into sets of polarized half-beam signals, each one of a set associated with a different one of said half-arrays; and utilization means including summing means for receiving said sets of polarized half-beam signals and operating upon them to give an indication as to which half-beam sets are providing polar condition permutations which, when summed over a period of time, exceed the statistical expectancy for that period of time by a significant amount.

6. A target-detection system comprising, in combination:

a beam-forming system of the modified Dimus-type, which has two interdigitated half-arrays, receiving as input signals the output signals of said half-arrays and converting said signals into sets of polarized half-beam signals, each one of a set associated with a different one of said half-arrays;

permuting means for converting each set of polarized half-beam signals into a set of four polar condition signals, ++, −−, +−, and −+; and utilization means connected to said permuting means for receiving said polar condition signals and separately aggregating each type.

7. A target-detection system comprising, in combination:

a beam-forming system of the modified Dimus-type, which has two interdigitated half-arrays, receiving as input signals the output signals of said half-arrays and converting said signals into sets of polarized half-beam signals, each one of a set associated with a different one of said half-arrays;
permuting means for converting each set of polarized half-beam signals into a set of four polar condition signals, ++, −−, +−, −+; and
display means for individually indicating the presence of each of said polar condition signals.

8. A target-detection system comprising, in combination:
a beam-forming system of the modified Dimus-type, which has two interdigitated half-arrays, receiving as input signals the output signals of said half-arrays and converting said signals into sets of polarized half-beam signals, each one of a set associated with a different one of said half-arrays;
permuting means for converting each set of polarized half-beam signals into a set of four polar condition signals, ++, −−, +−, and −+;
luminous means for individually indicating the presence of each of said polar condition signals by a light signal; and
photographic means comprising lens means and film means for focusing an image of said luminous means upon a film and making a photographic exposure thereof.

9. A target-detection system comprising, in combination:
a beam-forming system of the modified Dimus-type, which has two interdigitated half-arrays, receiving as input signals the output signals of said half-arrays and converting said signals into sets of polarized half-beam signals, each one of a set associated with a different one of said half-arrays;
permuting means for converting each set of polarized half-beam signals into a set of four polar condition signals, ++, −−, +−, and −+;
luminous means for individually indicating the presence of each of said polar condition signals by a light signal;

said luminous means comprising a set of four neon lamps for each set of half-beam signals, each lamp being connected to be energized by the presence of a different one of said polar condition signals; and
photographic means including a camera and film for focusing an image of said luminous means on said film and making time exposures of said image.

10. A target-detection system comprising, in combination:
a beam-forming system of the modified Dimus-type, which has two interdigitated half-arrays, receiving as input signals the output signals of said half-arrays and converting said signals into set of polarized half-beam signals, each one of a set associated with a different one of said half-arrays;
permuting means for converting each set of polarized half-beam signals into a set of four polar condition signals, ++, −−, +−, and −+;
luminous means for individually indicating the presence of each of said polar condition signals by a light signal;
said luminous means comprising a set of four neon lamps for each set of half-beam signals, each lamp beam connected to be energized by the presence of a different one of said polar condition signals; and
photographic means including a camera, film and photo-processing means for focusing an image of said luminous means on said film, making time exposures of said image and photographically developing said film.

References Cited

UNITED STATES PATENTS

| | | | |
|---|---|---|---|
| 2,897,351 | 7/1959 | Melton | 340—16 |
| 3,039,094 | 6/1962 | Anderson | 343—113 |

RICHARD A. FARLEY, Primary Examiner

U.S. Cl. X.R.

343—113